(12) United States Patent
Hinton et al.

(10) Patent No.: US 8,006,289 B2
(45) Date of Patent: Aug. 23, 2011

(54) METHOD AND SYSTEM FOR EXTENDING AUTHENTICATION METHODS

(75) Inventors: Heather M. Hinton, Austin, TX (US); Benjamin Harmon, Santa Cruz, CA (US); Anthony Moran, Ft. Lauderdale, FL (US)

(73) Assignee: International Business Machines Corporation, Armonk, NY (US)

(*) Notice: Subject to any disclaimer, the term of this patent is extended or adjusted under 35 U.S.C. 154(b) by 1248 days.

(21) Appl. No.: 11/305,646

(22) Filed: Dec. 16, 2005

(65) Prior Publication Data

US 2008/0134305 A1    Jun. 5, 2008

(51) Int. Cl.
*G06F 21/00* (2006.01)
(52) U.S. Cl. .................................... 726/5; 713/156
(58) Field of Classification Search .................. 726/5, 8
See application file for complete search history.

(56) References Cited

U.S. PATENT DOCUMENTS 7,711,832 B1 * 5/2010 Champion et al. ............ 709/228
2004/0123144 A1 * 6/2004 Chan et al. .................... 713/201

FOREIGN PATENT DOCUMENTS

WO    WO 0111451 A1 *    2/2001

* cited by examiner

*Primary Examiner* — Gilberto Barron, Jr.
*Assistant Examiner* — Simon Kanaan
(74) *Attorney, Agent, or Firm* — Jeffrey S. LaBaw; David H. Judson (57) ABSTRACT

A method is presented for managing authentication credentials for a user. A session management server performs session management with respect to the user for a domain that includes a protected resource. The session management server receives a request to access the protected resource, which requires authentication credentials that have been generated for a first type of authentication context. In response to determining that authentication credentials for the user have been generated for a second type of authentication context, the session management server sends to an authentication proxy server a first message that contains the authentication credentials for the user and an indicator for the first type of authentication context. The session management server subsequently receives a second message that contains updated authentication credentials for the user that indicate that the updated authentication credentials have been generated for the first type of authentication context.

20 Claims, 5 Drawing Sheets

METHOD AND SYSTEM FOR EXTENDING AUTHENTICATION METHODS

BACKGROUND OF THE INVENTION

1. Field of the Invention

The present invention relates to an improved data processing system and, in particular, to a method and apparatus for multicomputer data transferring. Still more particularly, the present invention is directed to authentication methods within computer systems.

2. Description of Related Art

E-commerce web sites and web applications perform transactions over computer networks on behalf of users. A user must often pass through an authentication procedure in order to prove the user's identity to an appropriate level of certainty for security purposes. In an e-commerce web-based environment, computer systems often implement authentication services as a form of front door or sentry gate for accessing a web site. These authentication services sit in front of applications, i.e. between the user and the applications, to ensure that the user is authenticated before obtaining access to any resources. These authentication services may be implemented as a web server plug-in, a reverse proxy, or other similar technology.

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources. Users generally desire the ability to change from interacting with one application to another application without regard to authentication barriers that protect each particular system supporting those applications.

As users get more sophisticated, they expect that computer systems coordinate their actions so that burdens on the user are reduced. These types of expectations also apply to authentication processes. A user might assume that once he or she has been authenticated by some computer system, the authentication should be valid throughout the user's working session, or at least for a particular period of time, without regard to the various computer architecture boundaries that are almost invisible to the user. Enterprises generally try to fulfill these expectations in the operational characteristics of their deployed systems, not only to placate users but also to increase user efficiency, whether the user efficiency is related to employee productivity or customer satisfaction.

Many computer systems have different types of authentication for different levels of security. For example, after a successful completion of a first level of authentication in which a correct username and password combination is provided by a user, a system may provide access to a particular set of resources on a web site. A second level of authentication might require a user to present a hardware token, e.g., a smartcard, after which the user is provided access to more tightly controlled resources on the web site. A third level of authentication might require the user to provide some form of biometric data, e.g., through a fingerprint scan or a retina scan, after which the system provides access to very sensitive or confidential resources on a web site. The process of moving up from one authentication level to the next level is termed "step-up authentication" or "forced re-authentication". In other words, the user steps from one level of authentication up to a higher level as required by a system in order to gain access to more sensitive resources.

Authentication can be accomplished with known authentication methods, but support for multiple custom methods is not easily accomplished. Authentication methods within typical reverse proxies are often limited to out-of-the-box supported methods, e.g., mutually authenticated SSL (Secure Sockets Layer), or various custom methods. Adding support for a new authentication method is not a simple process as a new authentication method is typically internalized within a server. Even within those systems that have support for adding new authentication methods by external applications, the support is limited in that it is possible to create a session for a user based on externalized authentication information but not possible to update a user's current session credentials, e.g., to reflect completion of another authentication operation.

To work around this limitation, current solutions cancel a user's current session and establish a new session with the new authentication method included in the new session information and credential information. A system can attempt to establish a new session in a manner that is invisible to the user, thereby reducing the burden on the user of awareness of the new session when such awareness is not required of the user. However, a problem remains in that state information is generally lost to some degree from the user's original session; in other words, downstream applications or protected resources may have some unforeseen problem with respect to the change from the old session to the new session.

Therefore, it would be advantageous to have a method and a system that can extend authentication methods to externalized applications that can update a user's credentials without requiring the establishment of a new session for the user, thereby obtaining a higher level of security that is required by an authentication service or by a protected resource for some purpose.

SUMMARY OF THE INVENTION

A method, a system, a computer program product, and an apparatus are presented for managing authentication credentials for a user. A method is presented for managing authentication credentials for a user. A session management server performs session management with respect to the user for a domain that includes a protected resource. The session management server receives a request to access the protected resource, which requires authentication credentials that have been generated for a first type of authentication context. In response to determining that authentication credentials for the user have been generated for a second type of authentication context, the session management server sends to an authentication proxy server a first message that contains the authentication credentials for the user and an indicator for the first type of authentication context. The session management server subsequently receives a second message that contains updated authentication credentials for the user that indicate that the updated authentication credentials have been generated for the first type of authentication context.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
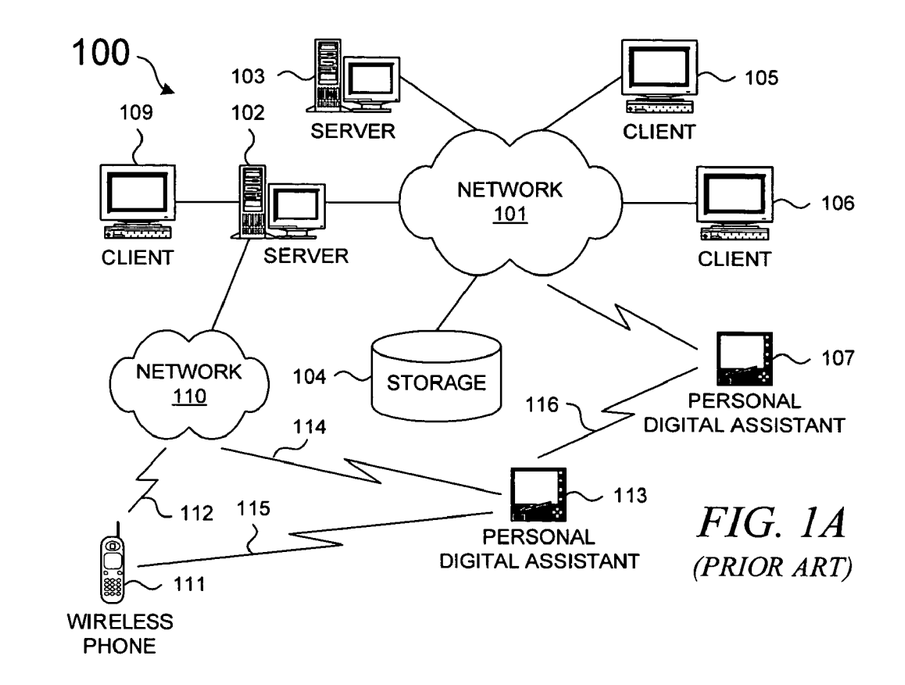
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
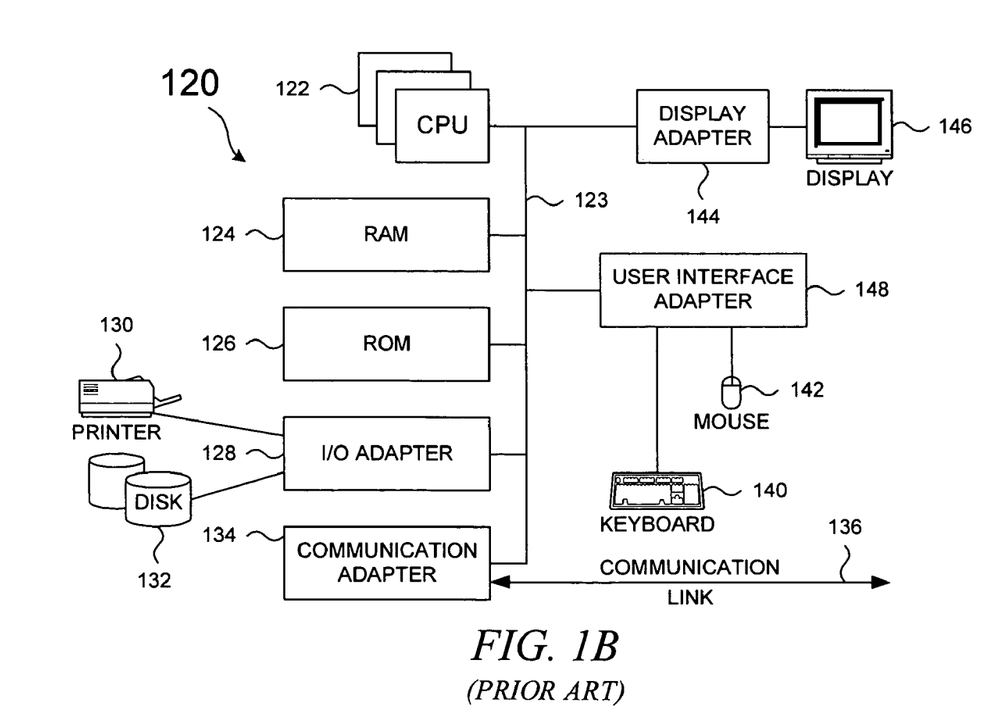
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved data processing environment. Prior to describing the present invention in more detail, some aspects of typical data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Certain computational tasks may be described hereinbelow as being performed by functional units. A functional unit may be represented by a routine, a subroutine, a process, a subprocess, a procedure, a function, a method, an object-oriented object, a software module, an applet, a plug-in, an ActiveX™ control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that, when appropriate, an exchange of information between computational components, which may include a synchronous or asynchronous request/response exchange, may be implemented equivalently via a variety of data exchange mechanisms, such as messages, method calls, remote procedure calls, event signaling, or other mechanism.

Figure 2:
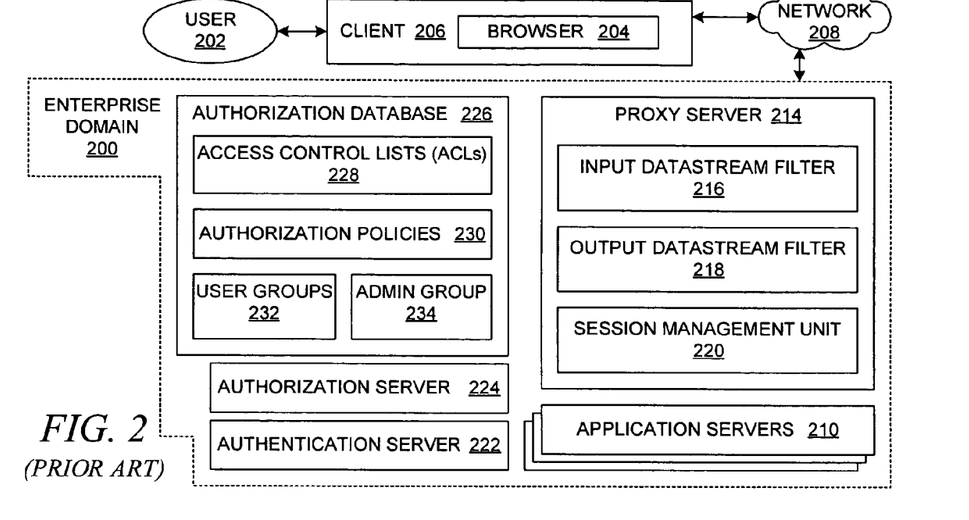
FIG. 2 depicts a block diagram that shows a typical enterprise data processing system.

With reference now to FIG. 2, a block diagram depicts a typical enterprise data processing system. Whereas FIG. 1A depicts a typical data processing system with clients and servers, in contrast, FIG. 2 shows a client within a network in relation to some of the server-side entities that may be used to support client requests to access resources. As in a typical computing environment, enterprise domain 200 hosts resources that user 202 can access, e.g., by using browser application 204 on client 206 through network 208; the computer network may be the Internet, an intranet, or other network, as shown in FIG. 1A.

Enterprise domain 200 supports multiple servers. Application servers 210 support controlled and/or uncontrolled resources through web-based applications or other types of back-end applications, including legacy applications. Reverse proxy server 214, or more simply, proxy server 214, performs a wide range of functions for enterprise domain 200. For example, proxy server 214 may cache web pages in order to mirror the content from an application server. Incoming and outgoing datastreams may be processed by input datastream filter 216 and output datastream filter 218, respectively, in order to perform various processing tasks on incoming requests and outgoing responses in accordance with goals and conditions that are specified within various policies or in accordance with a configuration of deployed software modules.

Session management unit 220 manages session identifiers, cached credentials, or other information with respect to sessions as recognized by proxy server 214. Web-based applications typically utilize various means to prompt users to enter authentication information, often as a username/password combination within an HTML form. In the example that is shown in FIG. 2, user 202 may be required to be authenticated before client 206 may have access to resources, after which a session is established for client 206. In an alternative embodiment, authentication and authorization operations are not performed prior to providing a user with access to resources on domain 200; a user session might be created without an accompanying authentication operation.

The above-noted entities within enterprise domain 200 represent typical entities within many computing environments. However, many enterprise domains have security features for controlling access to protected computational resources. A computational resource may be an application, an object, a document, a web page, a file, an executable code module, or some other computational resource or communication-type resource. A protected or controlled resource is a resource that is only accessible or retrievable if the requesting client or requesting user is authenticated and/or authorized; in some cases, an authenticated user is, by default, an authorized user. Authentication server 222 may support various authentication mechanisms, such as username/password, X.509 certificates, or secure tokens; multiple authentication servers could be dedicated to specialized authentication methods. Authorization server 224 may employ authorization database 226, which contains information such as access control lists 228, authorization policies 230, information about user groups or roles 232, and information about administrative users within a special administrative group 234. Using this information, authorization server 224 provides indications to proxy server 214 whether a specific request should be allowed to proceed, e.g., whether access to a controlled resource should be granted in response to a request from client 206. It should be noted that the present invention may be implemented in association with a variety of authentication and authorization applications, and the embodiments of the present invention that are depicted herein should not be interpreted as limiting the scope of the present invention with respect to a configuration of authentication and authorization services.

Figure 3:
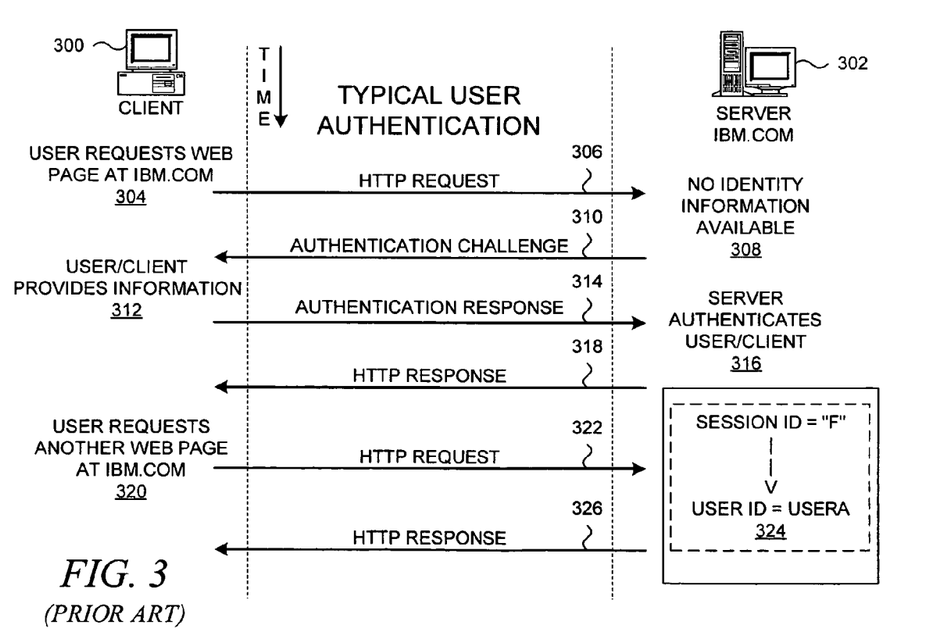
FIG. 3 depicts a dataflow diagram that shows a typical authentication process that may be used when a client attempts to access a protected resource at a server.

With reference now to FIG. 3, a data flow diagram illustrates a typical authentication process that may be used when a client attempts to access a protected resource at a server. As illustrated, the user at a client workstation 300 seeks access over a computer network to a protected resource on a server 302 through the user's web browser executing on the client workstation. A protected resource may be identified by a Uniform Resource Locator (URL), or more generally, a Uniform Resource Identifier (URI), that can only be accessed by an authenticated and authorized user.

The process is initiated when the user requests a server-side protected resource, such as a web page within the domain "ibm.com" (step 304). The terms "server-side" and "client-side" refer to actions or entities at a server or a client, respectively, within a networked environment. The web browser (or associated application or applet) generates an HTTP request that is sent to the web server that is hosting the domain "ibm.com" (step 306). The terms "request" and "response" should be understood to comprise data formatting that is appropriate for the transfer of information that is involved in a particular operation, such as messages, communication protocol information, or other associated information.

The server determines that it does not have an active session for the client (step 308), so the server requires the user to perform an authentication process by sending the client some type of authentication challenge (step 310). The authentication challenge may be in various formats, such as an HTML form. The user then provides the requested or required information (step 312), such as a user identifier and an associated password, or the client may automatically return certain information, such as a digital certificate.

The authentication response information is sent to the server (step 314), at which point the server authenticates the user or client (step 316), e.g., by retrieving previously submitted registration information and matching the presented authentication information with the user's stored information. Assuming the authentication is successful, an active session is established for the authenticated user or client.

The server then retrieves the requested web page and sends an HTTP response message to the client (step 318). At that point, the user may request another page within "ibm.com" (step 320) within the browser by clicking a hypertext link, and the browser sends another HTTP request message to the server (step 322). At that point, the server recognizes that the user has an active session based on session state information that is maintained by the server (step 324). For example, the server recognizes the appropriate session state information for the requesting user because the user's client returns a session ID within the HTTP request message. Based on the cached user session information, the server determines that the user has already been authenticated, e.g., by the availability of a copy of the user's credentials; the server can then determine that certain operations, such as an authentication operation, is not required to be performed prior to fulfilling the user's request. The server sends the requested web page back to the client in another HTTP response message (step 326), thereby fulfilling the user's original request for the protected resource.

Although FIG. 2 depicts a typical data processing system and FIG. 3 depicts a typical authentication process that may be used when a client attempts to access a protected resource at a server, the present invention is directed to an improved authentication infrastructure that extends an authentication operation to externalized applications that can update a user's credentials without requiring the establishment of a new session for the user, as illustrated in the remaining figures.

Figure 4:
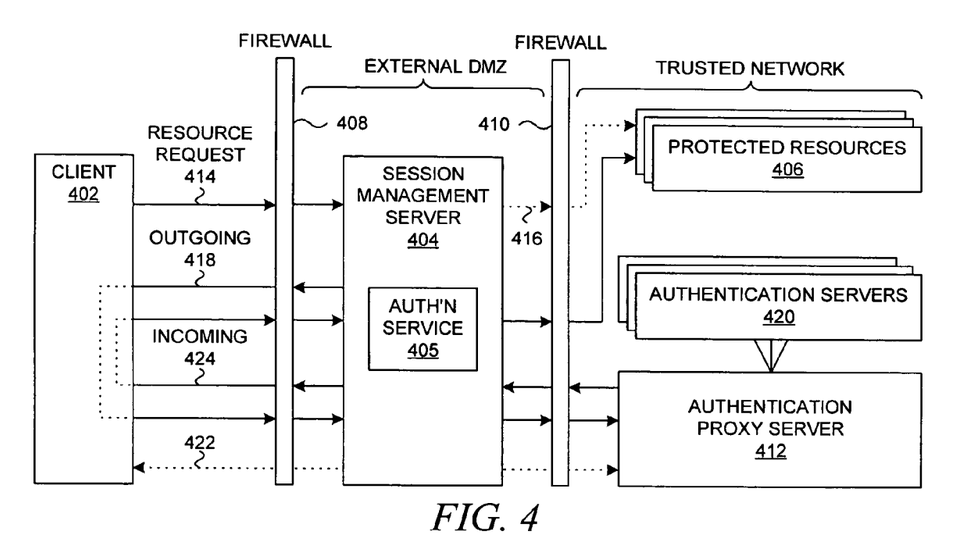
FIG. 4 depicts a block diagram that shows a portion of a data processing system for performing an extended authentication operation.

With reference now to FIG. 4, a block diagram depicts a portion of a data processing system for performing an extended authentication operation in accordance with an embodiment of the present invention. The data processing system that is shown in FIG. 4 is similar to the data processing system that is shown in FIG. 2. For example, within the two figures: client 402 is similar to client 206; session management server 404 is similar to proxy server 214; and protected resources 406 may represent applications servers 210 and other types of protected resources.

Session management server 404 preferably resides within an computational DMZ (DeMilitarized Zone) such that data that is transmitted to and from session management server 404 must pass through firewalls 408 and 410. Session management server 404 is responsible for session management with respect to user sessions that are created within a secure domain that comprises protected resources 406. Session management server 404 relies upon authentication service 405 to perform authentication operations when possible; in those cases in which authentication service 405 cannot perform an authentication operation, session management server 404 relies upon authentication proxy server 412, as explained in more detail below.

Session management server 404 and protected resources 406 may reside within a trusted network, which may represent computational resources within an enterprise domain, e.g., similar to enterprise domain 200 as shown in FIG. 2. However, various components, particularly authentication proxy server 412, may be hosted within other secure domains.

FIG. 4 illustrates components for discussing an implementation of the present invention in which an authentication operation can be externalized to a session management server that performs session management for a domain, wherein the authentication operation updates a user's credentials without requiring the establishment of a new session for the user. Moreover, FIG. 4 illustrates some of the dataflow between a client/user and the components that support the protected resources that are accessed by the client/user. The example dataflow to and from session management server 404 is illustrated as being redirected through a client; it should be noted, however, that the dataflow to and from session management server 404 may be performed through a variety of transmitted messages that are sent and/or forwarded to/from the session management server as well as other data transfer mechanisms that push or pull data to/from the session management server.

At some point in time, a user of client 402 may have already completed an authentication process via session management server 404 such that session management server 404 has credentials for the user; session management server 404 uses the credentials to provide the user with access to some protected resources 406, e.g., when forwarding or sending a user's received request to protected resources 406. In many instances, when session management server 404 receives a request to access a protected resource and determines that the requesting user's credentials are sufficient, session management server 404 forwards or sends the user's request without modification of the user's current credentials.

However, in the example that is shown in FIG. 4, when resource request 414 is received by session management server 404, resource request 414 is not forwarded to protected resources 406, e.g., as hypothetical forwarded request 416. In this instance, session management server 404 recognizes that resource request 414 is a request to access a protected resource that requires a credential that is adequate, valid, sufficient, satisfactory, or otherwise acceptable for assertion within a specific authentication context. In the illustrated example, session management server 404 recognizes that the user's current credential is inadequate, invalid, insufficient, unsatisfactory, or otherwise unacceptable for the authentication context that is required by the protected resource.

An authentication context is a set of one or more criteria or restrictions in which or for which authentication credentials were created or intended for use. An authentication context may indicate how one was authenticated, with whom one was authenticated, and/or the scope for which credentials were intended to be used. For example, a user's authentication credentials may have been generated by a particular authenticating entity whose identity is indicated within the authentication credential; in other words, the authentication credentials may indicate the entity with which/whom or by which/whom the user was authenticated. As another example, a user's authentication credentials may have been generated through a particular type, class, or category of authentication operation, the identity of which is indicated within the authentication credential, e.g., username/password, hardware token, biometric information, or other such authentication methods; in other words, the authentication credentials may indicate how the user was authenticated. As yet another example, a user's authentication credentials may indicate: a temporal period for which the credentials are intended to be valid; a transaction context for which the credentials are intended to be valid, such as only for banking transactions or only for purchasing transactions, etc.; whether the credentials are delegatable between parties; or some other intended limitation.

Thus, in the example in FIG. 4, the user's current credentials may indicate an invalidity or an insufficiency over a wide variety of characteristics. For example, the issuing authority of the user's current credentials might not be recognized by the operator of the protected resource. However, there may exist another issuing authority that is recognized by the operator of the protected resource; this other issuing authority may recognize the indicated issuing authority within the user's current credentials and may be willing to reissue the user's credentials based on verification of those credentials. As another example, the user's current credentials may indicate that they were generated in response to an authentication operation based upon verification of the user's successful assertion of a username/password pair. However, the operator of the protected resource may require authentication credentials that were generated in response to an authentication operation based upon the verification of a biometric assertion by the user.

Rather than forward the request for the protected resource at this time, session management server 404 instead sends message 418 to authentication proxy server 412; this message contains information for requesting an updated credential for the user for a different authentication context than the user previously obtained. Authentication proxy server 412 forwards the incoming request to an appropriate one of back-end authentication servers 420, which generates an updated credential based on the current credential information for the user that was included within message 418.

Authentication servers 420 may represent authentication servers, servlets, or other types of computational components, each of which provides support for accomplishing or performing a different type of authentication operation and/or an authentication operation within a different authentication context, thereby generating an authentication credential that is valid for a specific authentication context. Depending upon the implemented operation, an authentication server may require interaction 422 with the user/client to collect information for establishing the updated credential.

As noted above, an authentication context may comprise a set of one or more criteria or restrictions, each of which may be simple or obtuse. Thus, the authentication operation that is implemented by one of authentication servers 420 may be correspondingly simple or complex. For example, if the user's updated authentication credentials needs to be issued by a new issuing authority, then the authentication operation may involve a lengthy downstream process with additional entities or operators. In this example, after the user's updated authentication credentials have been issued by a specific issuing authority as required by the operator of a protected resource, the user's updated authentication credentials are said to have been generated for the authentication context that is required by the protected resource.

In another example, if the user's current authentication credentials have recently expired within the previous hour and an authentication server has the authority to extend the lifetime of the user's credentials by one hour, then the authentication operation may merely comprise the modification of the validity period within the updated authentication credentials, although this may also require the modification of a digital checksum or other data items in the credentials as well. In this example, after the user's updated authentication credentials have been generated by the authentication server to be valid over the current time period as required by the operator of a protected resource, the user's updated authentication credentials are said to have been generated for the authentication context that is required by the protected resource.

Authentication proxy server 412 then returns the updated credential by sending incoming message 424 to client 402, which then appropriately forwards it to session management server 404. Session management server 404 then caches, stores, or otherwise updates, associates, or modifies the user's current session state information with respect to the updated credentials.

Session management server 404 then sends the user's original request to the protected resource. The request may be accompanied by the user's updated credentials, which indicate the appropriate authentication context as required by the protected resource, or the user's updated credentials remain available for retrieval when necessary by downstream entities. In any case, the user has acquired credentials that are valid in the authentication context that is required by the protected resource that the user is attempting to access. It should be noted, though, that the user's possession of credentials that are valid in the authentication context that is required by the protected resource does not necessarily guarantee that the user's request to access the protected resource shall be granted or shall otherwise be successful; for example, a variety of errors may occur, or the user's request could be denied or rejected based on various other limitations, such as an assertion by a downstream entity of a restrictive policy that was not considered to be included within the required authentication context of the protected resource.

Figure 5:
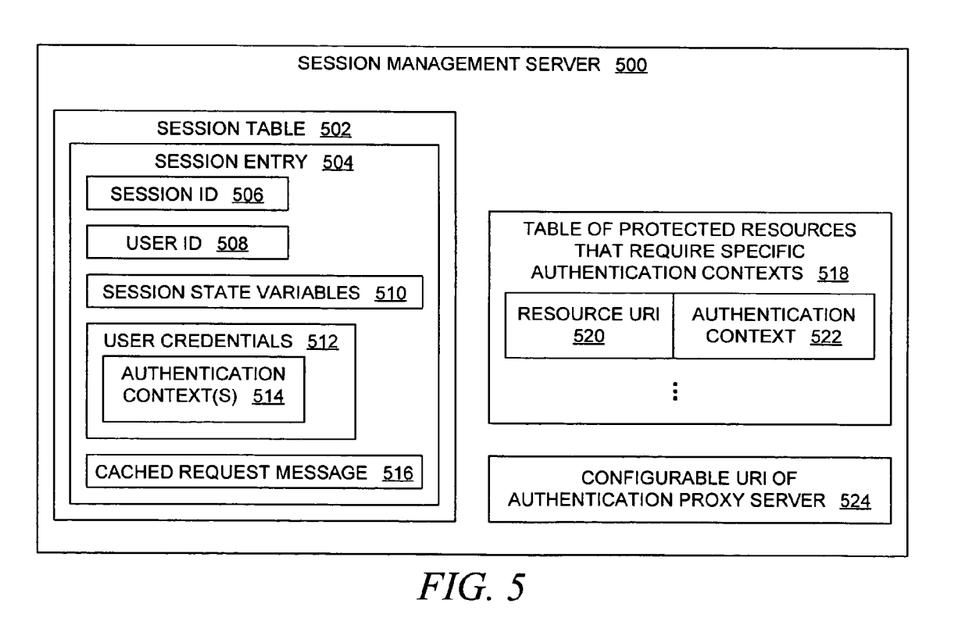
FIG. 5 depicts a block diagram that shows some of the information that is managed by a session management server that supports an authentication operation.

With reference now to FIG. 5, a block diagram depicts some of the information that is managed by a session management server that supports an extended authentication operation in accordance with an embodiment of the present invention. Session management server 500 is similar to session management server 404 that is shown in FIG. 4. Session management server 500 stores information for managing user sessions in session data structure 502, which is a table or some other type of data structure that contains multiple session entries, such as session entry 504. Session entry 504 contains session identifier 506, which is a unique identifier for the session. Session entry 504 may also store user identifier 508, which is a unique identifier for the user that is associated with the client that initiated the session within the enterprise domain that contains session management server 500. Additional session state variables 510 may be locally stored in each session entry.

Session entry 504 also contains user credentials 512 that are employed when necessary to authorize the user who possesses the credentials to access protected resources. User credentials 512 indicate the authentication context or contexts 514 in which the credentials were generated. Session entry 504 may also contain cached request message 516, which is a stored copy of the original request message from a client/user that initiates the need to perform an authentication operation to obtain updated credentials.

Session management server 500 also stores table 518 or similar data structure that indicates the protected resources that require specific authentication contexts. Each resource may be identified by its URI, and its required authentication context can be associatively stored with the URI, thereby forming key-value pairs having URI 520 and authentication context indicator 522 for each represented protected resource. Depending on the implementation of an authentication context, authentication context indicator 522 may be a set of one or more data items.

Session management server 500 also stores configurable authentication proxy server URI 524 that indicates the location of the authentication proxy server. Configurable URI 524 and configurable table 518 may be cached in memory after retrieval from a configuration file during an initialization phase of session management server 500.

Figure 6:
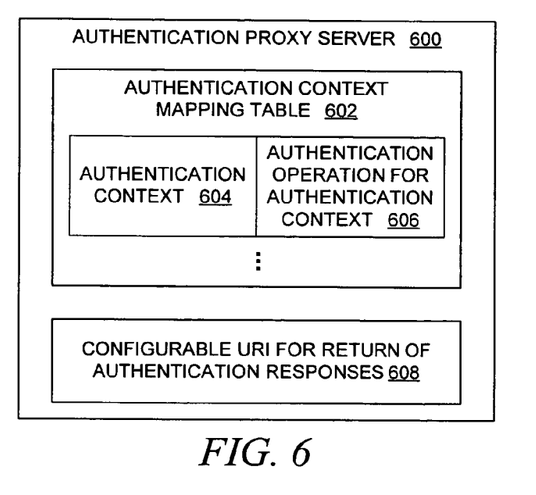
FIG. 6 depicts a block diagram that shows some of the information that is managed by an authentication proxy server that supports an authentication operation.

With reference now to FIG. 6, a block diagram depicts some of the information that is managed by an authentication proxy server that supports an authentication operation in accordance with an embodiment of the present invention. Authentication proxy server 600 is similar to authentication proxy server 412 that is shown in FIG. 4. Authentication proxy server 600 stores information for mapping from a requested authentication context to an authentication operation that is able to generate a user credential that is valid for the associated authentication context. For example, data structure 602, which may be a table or similar data structure, contains key-value pairs; each indicator of an authentication context 604 is paired with an authentication operation 606. Depending on the implementation of an authentication context, authentication context indicator 604 may be a set of one or more data items.

In addition, authentication proxy server 600 also stores configurable session management server URI 608 that indicates the location of the session management server from which authentication requests are received and/or to which authentication responses should be returned. Configurable URI 608 and configurable table 602 may be cached in memory after retrieval from a configuration file during an initialization phase of authentication proxy server 600.

Figure 7:
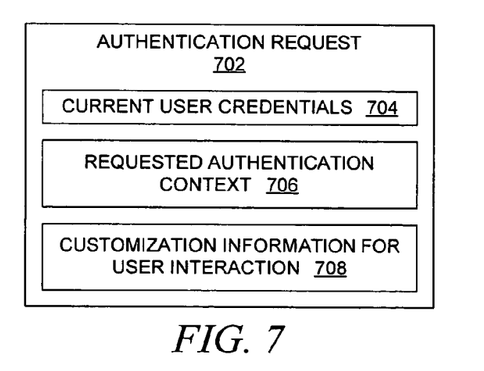
FIG. 7 depicts a block diagram that shows some of the information that may be contained in an authentication request message between a session management server to an authentication proxy server.

With reference now to FIG. 7, a block diagram depicts some of the information that may be contained in an authentication request message between a session management server to an authentication proxy server in accordance with an embodiment of the present invention. Authentication request message 702 contains a copy of the user's current credentials 704; the user's current credentials are employed as required by a back-end authentication method/server to generate the updated user credentials. Requested authentication context 706 indicates the authentication context for which the updated user credentials are required, as determined by the session management server that has initiated the authentication operation. In some cases, the back-end authentication method/server may need to interact with the user to complete the authentication operation; for those cases, customization information 708 is included in authentication request 702. It should be noted that authentication request message 702 represents information items that are associatively stored and/or transmitted, and these information items may be implemented in a variety of data formats, including their inclusion as content that is embedded within other messages.

Customization information 708 can be used to customize the information that is exchanged with the user's client when the user is being requested to interact to complete the authentication operation. By providing the user's name or other contextual information, the authentication operation can be made more user-friendly or more informative about the need for the authentication operation, e.g., indicating that a user-requested transaction requires additional security procedures because the transaction must interact with another web site that is known to the user.

Figure 8:
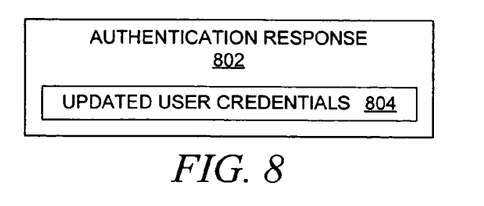
FIG. 8 depicts a block diagram that shows some of the information that may be contained in an authentication response message from an authentication proxy server to a session management server.

With reference now to FIG. 8, a block diagram depicts some of the information that may be contained in an authentication response message from an authentication proxy server to a session management server in accordance with an embodiment of the present invention. Authentication response message 802 contains a copy of the user's updated credentials 804. The updated credentials would be cached when received by the session management server that initially requested the updated credentials through the authentication operation. For example, the updated credentials could be cached within the appropriate user's session entry information for subsequent use in accessing protected resources. It should be noted that authentication response message 802 represents information items that are associatively stored and/or transmitted, and these information items may be implemented in a variety of data formats, including their inclusion as content that is embedded within other messages.

Figure 9:
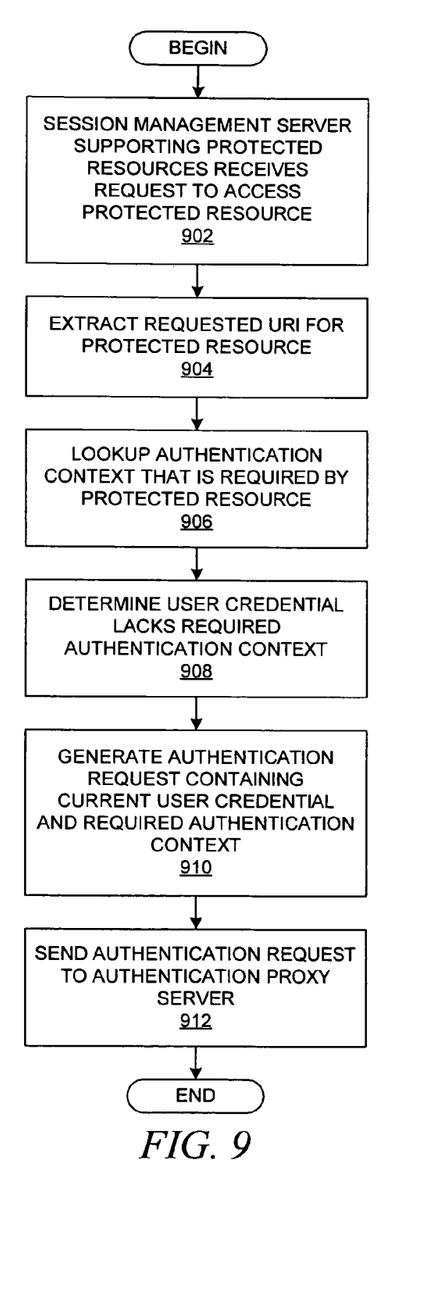
FIG. 9 depicts a flowchart that shows a process through which a session management server initiates an authentication operation.

With reference now to FIG. 9, a flowchart depicts a process through which a session management server initiates an authentication operation in accordance with an embodiment of the present invention. The process commences when the session management server, such as session management server 404 that is shown in FIG. 4, receives a request to access a protected resource (step 902); the request may be cached within the user's session information for subsequent retrieval. The session management server extracts the requested URI of the protected resource from the incoming request message (step 904) and performs a lookup operation using the extracted URI to obtain the authentication context that is required by the protected resource (step 906); the lookup operation is performed using a configurable table or other datastore, such as the table that is shown in FIG. 5. In this example, the session management server determines that the user's credentials lack the required authentication context (step 908). In other words, the user's current credentials are invalid, inadequate, insufficient, unsatisfactory, or otherwise of a different type or character than is required by the protected resource that the user is attempting to access. Hence, the session management server determines that an authentication operation is required to update the user's credentials. If the user's credentials satisfy the requirements for a particular authentication context for the protected resource, then the user's request can be forwarded as needed to attempt to obtain access to the protected resource without further processing, which is not shown in the figure.

The session management server generates an authentication request (step 910), which includes the current user credentials and an indication of the authentication context that is required by the protected resource. The session management server then sends the generated authentication request within a message to the authentication proxy server (step 912), and the process is concluded. The URI of the authentication proxy server may be a configurable value that is retrieved by the session management server from an appropriate datastore, e.g., as shown in FIG. 5.

Figure 10:
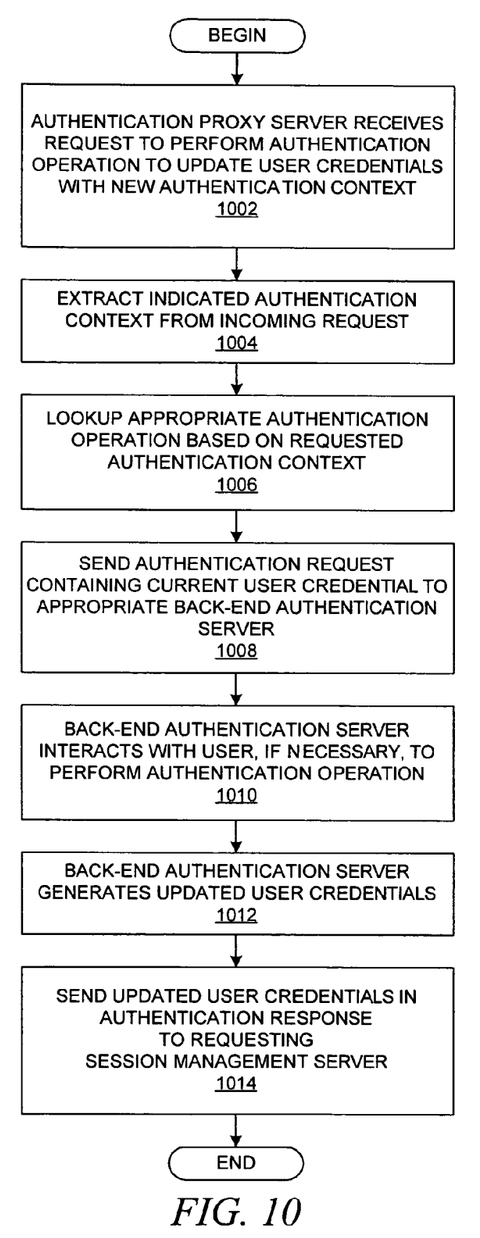
FIG. 10 depicts a flowchart that shows a process through which an authentication proxy server manages an authentication operation as requested.

With reference now to FIG. 10, a flowchart depicts a process through which an authentication proxy server manages an authentication operation as requested in accordance with an embodiment of the present invention. The process commences when the authentication proxy server receives an authentication request (step 1002). The received request indicates in some manner that an update to current credentials is being requested with respect to a particular type of authentication context as indicated within the received request. The authentication proxy server extracts the indicated authentication context from the incoming request (step 1004) and performs a lookup operation using the indicated authentication context to obtain the authentication operation that has been associated with the authentication context (step 1006); the lookup operation is performed using a configurable table or other datastore, such as the table that is shown in FIG. 6.

The authentication request, which still contains the user's current credentials, is forwarded or otherwise sent to the appropriate back-end authentication server (step 1008) as determined from the lookup operation. The authentication server interacts with the user, if necessary, to obtain additional information or to otherwise complete the required authentication operation with respect to the user (step 1010). The authentication server generates the updated user credentials (step 1012), which are provided or sent to the authentication proxy server in some manner. The authentication proxy server sends the updated user credentials as an authentication response within a message to the requesting session management server (step 1014), thereby concluding the process. The URI of the requesting session management server may be a configurable value that is retrieved by the authentication proxy server from an appropriate datastore, e.g., as shown in FIG. 6.

Figure 11:
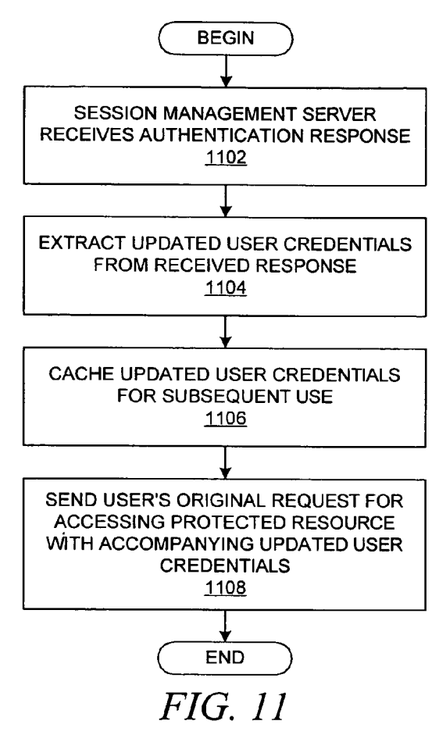
FIG. 11 depicts a flowchart that shows a process through which a session management server completes an authentication operation.

With reference now to FIG. 11, a flowchart depicts a process through which a session management server completes an authentication operation in accordance with an embodiment of the present invention. The process commences when the session management server that had initiated the authentication operation receives a response to its request (step 1102), and the updated user credentials are extracted from the response (step 1104) and cached for subsequent use (step 1106). The user's original request to access the protected resource is then retrieved, e.g., from the user's session information, and sent to the protected resource (step 1108) in an appropriate manner, thereby concluding the process. The request may be accompanied by the user's updated credentials, which indicate the appropriate authentication context as required by the protected resource, or the user's updated credentials remain available for retrieval when necessary by downstream entities.

The advantages of the present invention should be apparent in view of the detailed description of the invention that is provided above. A protected resource can require that a user has obtained authentication credentials within a particular authentication context, as indicated by a configurable authentication context indicator that is associated with the protected resource's URI. When a request to access a protected resource is received, the authentication context that is needed by the requested protected resource is compared with the authentication context in which or for which the user's credentials were generated, e.g., as indicated within the user's credentials. If the user has not been authenticated within this authentication context, i.e. if the user's credentials do not indicate the appropriate authentication context, then the present invention triggers the re-authentication of the user using an authentication operation that is appropriate for the protected resource's required authentication context.

The present invention allows a system administrator to efficiently extend the authentication operations that are available for use within a data processing system by deploying the authentication operations or servers behind a single authentication proxy server. Hence, configuration of the session management server is easily performed by specifying a single URI for the single authentication proxy server. All incoming requests that require authentication are then treated equally by the session management server. The session management server maintains a pre-existing user session with which the updated credentials become associated without establishing a new session for the updated credentials.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer-implemented method for managing authentication credentials for a user within a data processing system, the method comprising:

receiving at a session management server from a client a request to access a protected resource on behalf of a user, wherein the session management server performs session management with respect to the user for a domain that includes the protected resource, and wherein access to the protected resource requires authentication credentials that have been generated for a first type of authentication context;

in response to determining by the session management server that authentication credentials for the user indicate that the authentication credentials have been generated for a second type of authentication context, sending a first message from the session management server to an authentication proxy server, wherein the first message contains the authentication credentials for the user and an indicator for the first type of authentication context; and receiving a second message at the session management server from the authentication proxy server, wherein the second message contains updated authentication credentials for the user, and wherein the updated authentication credentials indicate that the updated authentication credentials have been generated for the first type of authentication context.

2. The computer-implemented method of claim 1 further comprising:

associating the updated authentication credentials with a pre-existing session for the user without requiring establishment of a new session for the user.

3. The computer-implemented method of claim 1 further comprising:

sending from the session management server the request to access the protected resource on behalf of the user after receiving the updated authentication credentials.

4. The computer-implemented method of claim 1 further comprising:

extracting by the session management server a Uniform Resource Identifier (URI) for the protected resource from the request to access the protected resource; and performing a lookup operation based on the extracted URI to obtain the first type of authentication context.

5. The computer-implemented method of claim 1 further comprising:

retrieving by the session management server a URI for the authentication proxy server from configurable information; and employing the retrieved URI for the authentication proxy server for each request from the session management server to obtain updated credentials.

6. The computer-implemented method of claim 1 further comprising:
retrieving by the authentication proxy server a URI for the session management server from configurable information; and
employing the retrieved URI for the session management server for each response from the authentication proxy server to return updated credentials.

7. The computer-implemented method of claim 1 further comprising:
extracting by the authentication proxy server from the first message the indicator for the first type of authentication context; and
performing a lookup operation based on the extracted indicator for the first type of authentication context to determine an authentication method to be employed to update the authentication credentials for the user.

8. The computer-implemented method of claim 7 further comprising:
sending by the authentication proxy server the authentication credentials to the determined authentication method.

9. A computer program product on a computer-readable storage medium for use within a data processing system for managing authentication credentials for a user, the computer program product holding computer program instructions which when executed by the data processing system perform a method comprising:
receiving at a session management server from a client a request to access a protected resource on behalf of a user, wherein the session management server performs session management with respect to the user for a domain that includes the protected resource, and wherein access to the protected resource requires authentication credentials that have been generated for a first type of authentication context;
sending, in response to determining by the session management server that authentication credentials for the user indicate that the authentication credentials have been generated for a second type of authentication context, a first message from the session management server to an authentication proxy server, wherein the first message contains the authentication credentials for the user and an indicator for the first type of authentication context; and
receiving a second message at the session management server from the authentication proxy server, wherein the second message contains updated authentication credentials for the user, and wherein the updated authentication credentials indicate that the updated authentication credentials have been generated for the first type of authentication context.

10. The computer program product of claim 9 wherein the method further comprises:
associating the updated authentication credentials with a pre-existing session for the user without requiring establishment of a new session for the user.

11. The computer program product of claim 9 wherein the method further comprises:
sending from the session management server the request to access the protected resource on behalf of the user after receiving the updated authentication credentials.

12. The computer program product of claim 9 wherein the method further comprises:
extracting by the session management server a Uniform Resource Identifier (URI) for the protected resource from the request to access the protected resource; and
performing a lookup operation based on the extracted URI to obtain the first type of authentication context.

13. The computer program product of claim 9 wherein the method further comprises:
retrieving by the session management server a URI for the authentication proxy server from configurable information; and
employing the retrieved URI for the authentication proxy server for each request from the session management server to obtain updated credentials.

14. The computer program product of claim 9 wherein the method further comprises:
retrieving by the authentication proxy server a URI for the session management server from configurable information; and
employing the retrieved URI for the session management server for each response from the authentication proxy server to return updated credentials.

15. The computer program product of claim 9 wherein the method further comprises:
extracting by the authentication proxy server from the first message the indicator for the first type of authentication context; and
performing a lookup operation based on the extracted indicator for the first type of authentication context to determine an authentication method to be employed to update the authentication credentials for the user.

16. The computer program product of claim 15 wherein the method further comprises:
sending by the authentication proxy server the authentication credentials to the determined authentication method.

17. An apparatus for managing authentication credentials for a user within a data processing system, the apparatus comprising:
a processor;
a computer memory holding computer program instructions which when executed by the processor perform a method comprising:
receiving at a session management server from a client a request to access a protected resource on behalf of a user, wherein the session management server performs session management with respect to the user for a domain that includes the protected resource, and wherein access to the protected resource requires authentication credentials that have been generated for a first type of authentication context;
sending, in response to determining by the session management server that authentication credentials for the user indicate that the authentication credentials have been generated for a second type of authentication context, a first message from the session management server to an authentication proxy server, wherein the first message contains the authentication credentials for the user and an indicator for the first type of authentication context; and
receiving a second message at the session management server from the authentication proxy server, wherein the second message contains updated authentication credentials for the user, and wherein the updated authentication credentials indicate that the updated authentication credentials have been generated for the first type of authentication context.

18. The apparatus of claim 17 wherein the method further comprises:
associating the updated authentication credentials with a pre-existing session for the user without requiring establishment of a new session for the user.

19. The apparatus of claim 17 wherein the method further comprises:
sending from the session management server the request to access the protected resource on behalf of the user after receiving the updated authentication credentials.

20. The apparatus of claim 17 wherein the method further comprises:
extracting by the session management server a Uniform Resource Identifier (URI) for the protected resource from the request to access the protected resource; and
performing a lookup operation based on the extracted URI to obtain the first type of authentication context.

* * * * *